No. 829,643. PATENTED AUG. 28, 1906.
G. A. FORD.
STORAGE BATTERY.
APPLICATION FILED DEC. 22, 1905.

Witnesses
E. B. Gilchrist
H. R. Sullivan

Inventor
George A. Ford
By Thurston Bates Woodward
Attorney

UNITED STATES PATENT OFFICE.

GEORGE A. FORD, OF CLEVELAND, OHIO, ASSIGNOR TO HARRIET S. FORD, OF CLEVELAND, OHIO.

STORAGE BATTERY.

No. 829,643.  Specification of Letters Patent.  Patented Aug. 28, 1906.

Application filed December 22, 1905. Serial No. 292,892.

*To all whom it may concern:*

Be it known that I, GEORGE A. FORD, a citizen of the United States, residing at Cleveland, in the county of Cuyahoga and State of Ohio, have invented a certain new and useful Improvement in Storage Batteries, of which the following is a full, clear, and exact description, reference being had to the accompanying drawings.

This invention is an improvement in the type of storage batteries which forms the subject of my pending application, Serial No. 284,619, filed October 27, 1905, in which battery there is employed to contain and separate the battery-plates a plurality of horizontally-disposed trays or dishes made of infrangible absorbent material—such as pulpboard, paper, wood, and the like. Such trays when immersed in a battery solution are wet through, and thereby their strength and stiffness are greatly reduced. The object of this invention is to provide in a storage battery of the type specified practical means for reinforcing and strengthening said trays without materially reducing the efficiency of the battery.

The invention consists of a storage battery made up of a plurality of superposed battery units, each consisting of a tray made of infrangible absorbent material having an upturned marginal flange and a bottom which inclines upward from its middle to the said marginal flange, combined with a stiff frame having a bottom in the form of a grid upon which the bottom of the tray is adapted to rest and which inclines upward from the center toward the sides to substantially correspond with the bottom of said tray, which frame has also an upturned marginal flange adapted to embrace the marginal flange of the tray resting upon said grid-formed bottom and an electrode in said tray.

Figure 1:
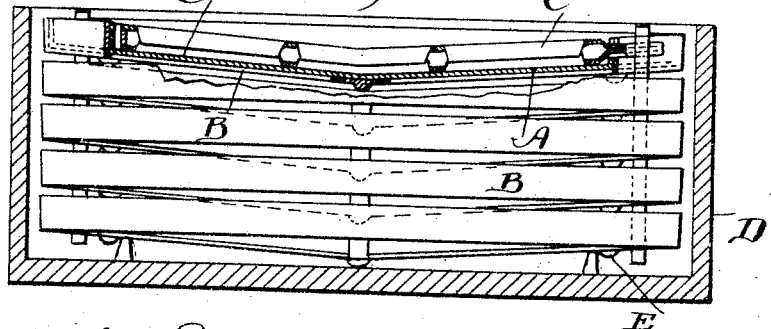
Figure 2:
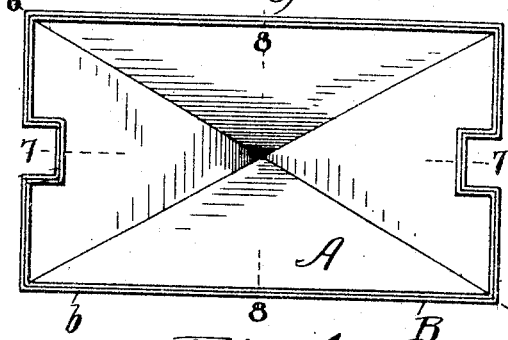
Figure 3:
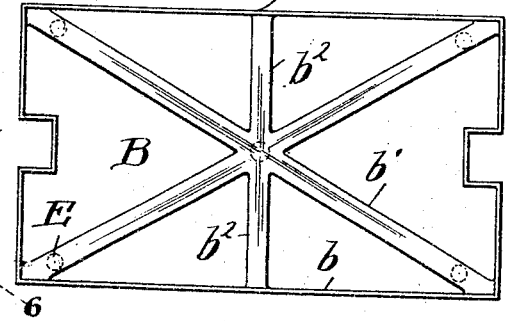
Figure 4:
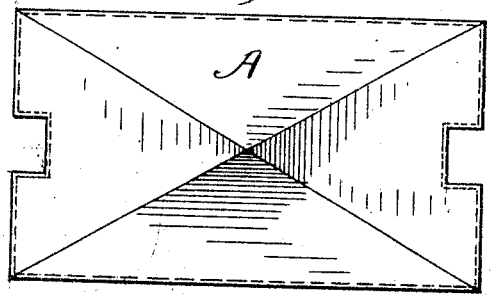
Figure 5:
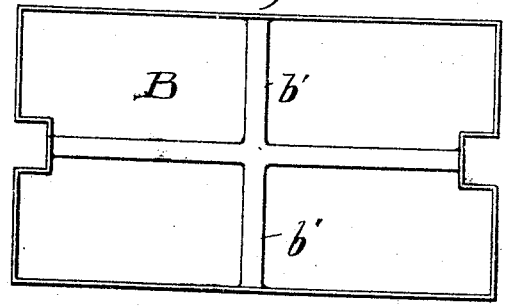
Figure 6:
Figure 7:
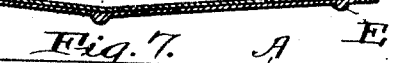
Figure 8:
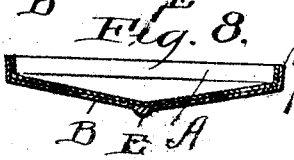

In the drawings, Figure 1 is a side elevation of the battery whereof the jar and the upper battery unit is in central vertical section. Fig. 2 is a plan view of one of the trays. Fig. 3 is a plan view of one form of the reinforcing-frame. Fig. 4 is a bottom view of a tray. Fig. 5 is a plan view of a modified form of the reinforcing-frame. Fig. 6 is a sectional view through a frame like that shown in Fig. 3 and a tray fitted therein, the section being in the plane indicated by the diagonal line 6 6 of Fig. 2. Fig. 7 is a sectional view of the reinforcing-frame shown in Fig. 3 with a tray fitted therein, the section being in the plane indicated by line 7 7 of Fig. 2. Fig. 8 is a sectional view in the plane indicated by line 8 8 of Fig. 2, showing a frame shown in Fig. 3 with a tray fitted therein.

Referring to the parts by letters, A represents a tray which may be made of paper, pulp-board, wood, or any other analogous substance which is absorbent and infrangible. The marginal edges of this tray turn upward, although, preferably, not quite into vertical position. The bottom of the tray inclines upward from a central point to the edges, this inclination being to facilitate the escape to the edges of the trays of any gases generated in said tray or the tray beneath it.

B represents a reinforcing-frame having an upturned marginal flange $b$, adapted to embrace and bear against the outer surface of the marginal flange of the tray. The bottom of this reinforcing-frame should be as open as possible to enable it to properly support the bottom of the tray A, and preferably it is made of a plurality of bars $b'$, meeting at a common central point beneath the lowest point of the tray and extending therefrom at an inclination corresponding with the inclination of the bottom of the tray A to the marginal flange $b$. It is of course apparent that the bottom of tray A is made up of four differently-inclined portions which are merged together in lines running from the center of the bottom to the four corners thereof.

In the construction of the reinforcing-frame, as shown in Fig. 3, its bottom consists of four bars $b'$, meeting at a point below the center of the tray and extending therefrom to the four corners of the marginal flange, wherefore these bars support the tray along the four angles in its bottom. In addition to these bars, preferably there are two other bars $b^2$, extending also from the center of the frame to the middle of the long sides of the frame. The frame shown in Fig. 5 has its bottom made up of four inclined bars, which extend from the center to the middle of the four sides. It will be understood that the bottom of the reinforcing-frame is not required to be of the form shown in either Figs. 3 or 5. The bottom should be as open as it can be and yet be adapted to support the bottom of the tray, and that is all that is required. The particular frames shown in Figs. 3 and 5 are preferred because they offer no obstructions to the free flow toward the marginal edge of the frame of bubbles of gas which rise from the tray next beneath it. This reinforcing-frame may be made of any suitable material which the battery solution will not rapidly attack. It may be made of gutta-percha or wood. It has been found, however, that if it be made of pulp-board thoroughly impregnated with asphaltum it will serve the stated purpose, and when so made of said material it is much cheaper than if made of gutta-percha or wood.

C represents the electrode which is placed in the tray, and D the battery-jar. The reinforcing-frame of one unit will rest upon and be supported by the electrode of the unit next below it. It is desirable that the units shall be separated enough to allow the battery solution to freely circulate between them, and for this reason it is preferred to employ separators E, which may be independent small pieces or bosses formed on the under side of the bars $b'$.

Having described my invention, I claim—

1. A storage battery comprising a number of superposed battery units each consisting of a tray made of infrangible absorbent material having upturned marginal edges and a bottom which inclines from a central point upward to said marginal edges, a reinforcing-frame having a bottom which is inclined to correspond with the inclination of the bottom of the tray, and is made of narrow bars, and an upturned marginal flange adapted to embrace and engage with the flange of the tray, and an electrode in said tray.

2. In a storage battery, the combination of a tray made of infrangible absorbent material having upturned marginal edges and a bottom which inclines downward from said marginal edges toward the center of the tray, with a reinforcing-frame having a bottom made of narrow bars which are inclined to correspond with the bottom of the tray, and having an upturned marginal flange adapted to embrace and engage with the flange of one of said trays when its bottom is resting upon the bottom of the frame.

3. In a storage battery, the combination of a dish-shaped tray made of absorbent infrangible material having an upturned marginal flange, with a reinforcing-frame having a bottom made up of a plurality of connected bars extending from about the middle of said bottom outward and upward at an inclination corresponding to the inclination of the bottom of the tray, and an upturned marginal flange united with the outer ends of said bars and adapted to embrace the marginal flange of said tray when it is resting upon said bottom bars.

In testimony whereof I hereunto affix my signature in the presence of two witnesses.

GEORGE A. FORD.

Witnesses:
E. L. THURSTON,
E. B. GILCHRIST.